(12) United States Patent
Kobayashi et al.

(10) Patent No.: US 6,373,322 B2
(45) Date of Patent: *Apr. 16, 2002

(54) CHARGE PUMP CIRCUIT WITH BYPASS TRANSISTOR

(75) Inventors: Isamu Kobayashi; Yoshiharu Kato, both of Kasugai (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,065

(22) Filed: Oct. 15, 1999

(30) Foreign Application Priority Data

Feb. 12, 1999 (JP) .............................. 11-034128

(51) Int. Cl.$^7$ ................................................ G05F 1/10
(52) U.S. Cl. ........................................ 327/536; 327/537
(58) Field of Search ................. 327/536, 537, 327/437, 589

(56) References Cited

U.S. PATENT DOCUMENTS

| 5,036,229 A | 7/1991 | Tran | 322/530 |
|---|---|---|---|
| 5,066,870 A | * 11/1991 | Kobatake | 327/537 |
| 5,874,850 A | * 2/1999 | Pulvirenti et al. | 327/537 |
| 5,881,012 A | * 3/1999 | Kawasaki et al. | 327/537 |
| 5,999,040 A | 12/1999 | Do et al. | 327/536 |
| 6,023,187 A | * 2/2000 | Camacho et al. | 327/537 |

FOREIGN PATENT DOCUMENTS

| EP | 0 836 129 | 4/1998 |
|---|---|---|
| EP | 0 866 545 | 9/1998 |

* cited by examiner

Primary Examiner—Dinh T. Le
(74) Attorney, Agent, or Firm—Arent Fox Kintner Plotkin & Kahn PLLC

(57) ABSTRACT

A two stage charge pump circuit can perform either a two stage boosting operation or a single stage boosting operation. The charge pump circuit includes first, second and third gate transistors connected in series between first and second supply voltages, and a bypass transistor. A first booster stage includes a capacitor connected between the first and second gate transistors and a drive circuit. A second booster stage includes a capacitor connected between second and third gate transistors and the drive circuit. The third gate transistor is connected to an internal bus which provides an output voltage to other circuit elements connected to it. The bypass transistor is connected between the first booster stage and the internal bus.

22 Claims, 7 Drawing Sheets

CHARGE PUMP CIRCUIT WITH BYPASS TRANSISTOR

BACKGROUND OF THE INVENTION

The invention relates to a voltage conversion circuit, and more particularly, to a voltage conversion circuit including a charge pump circuit for boosting an input voltage.

There is a practice in the prior art that whenever a semiconductor memory, such as a DRAM, is not in use, an external supply voltage which has a lower than normal level is provided to the semiconductor memory, thus switching the voltage supply to a low voltage mode. In the low voltage mode, an external supply voltage of a level which is sufficient to enable a refresh operation for maintaining stored information is used, thus reducing the power dissipation of the semiconductor memory.

A semiconductor memory is generally provided with a voltage conversion circuit which boosts an external supply voltage to supply various internal circuits with a boosted voltage or voltages. For example, such a voltage conversion circuit boosts an external supply voltage of 3.3 volts, which is supplied during a normal voltage mode, to a voltage range from 4.5 to 4.8 volts or boosts an external supply voltage of 2.0 volts, which is supplied during a low voltage mode, to a voltage range from 3.5 to 3.8 volts.

Figure 1:
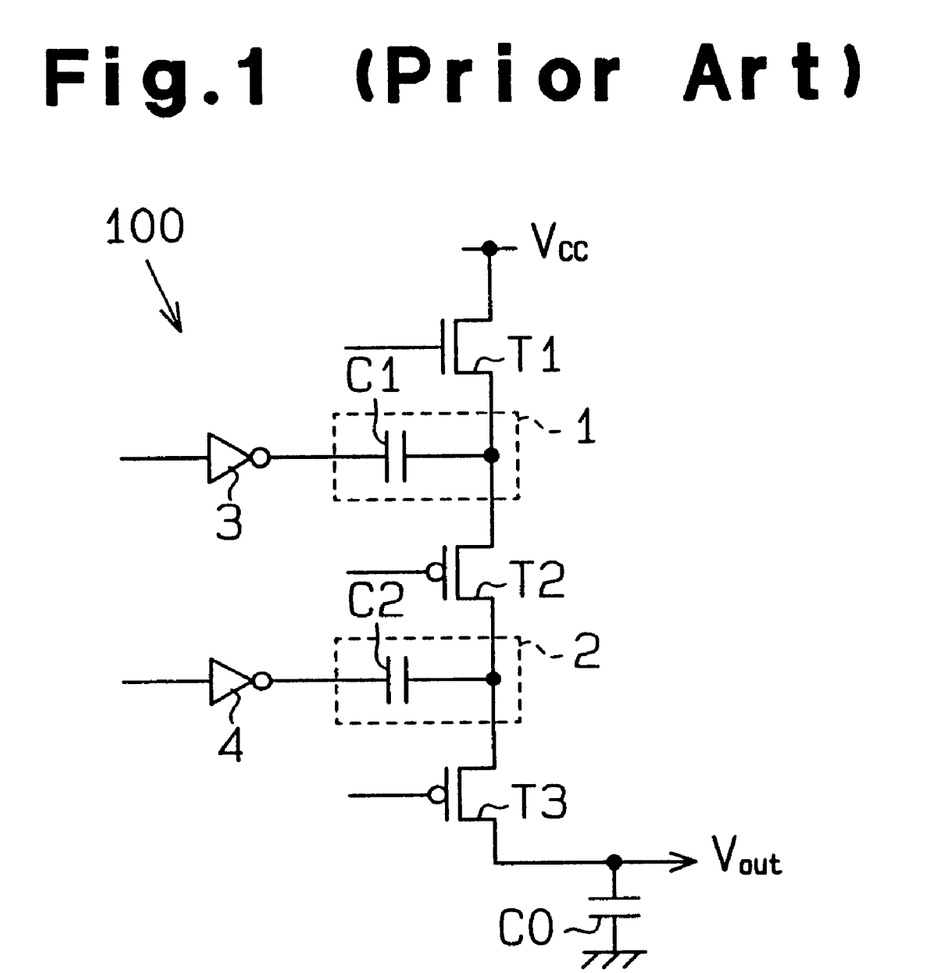
FIG. 1 is a circuit diagram of a conventional charge pump circuit.

A conventional charge pump circuit 100 as shown in FIG. 1 is extensively employed as a voltage conversion circuit.

Referring to FIG. 1, the charge pump circuit 100 comprises first and second booster stages 1, 2, first and second inverter circuits 3, 4, first, second and third gate transistors T1, T2, T3 and a stabilizing capacitive element C0. The first booster stage 1 is connected to an external supply voltage Vcc via the first gate transistor T1 which is formed by an NMOS transistor. The second transistor T2 which is formed by a PMOS transistor is connected between the first booster stage 1 and the second booster stage 2. The second booster stage 2 is connected to an internal bus which supplies a voltage Vout to various circuits via the third gate transistor T3 formed by a PMOS transistor.

The first booster stage 1 comprises a first capacitive element C1 which has a first terminal connected to the source terminals of the first and second gate transistors T1, T2 and a second terminal connected to the output terminal of the first inverter circuit 3 which is formed by a CMOS transistor. The second booster stage 2 comprises a second capacitive element C2 which has a first terminal connected to the drain terminal of the second gate transistor T2 and to the source terminal of the third gate transistor T3 and which also has a second terminal connected to the output terminal of the second inverter circuit 4 which is formed by a CMOS transistor. The stabilizing capacitive element C0 has a first terminal connected to the internal bus and a second terminal connected to ground, but which may alternatively be connected to the external supply voltage Vcc.

When the first inverter circuit 3 delivers an L level (0 volt) signal, the first capacitive element C1 is charged in response to the turn-on of the first gate transistor T1 and the turn-off of the second gate transistor T2. The potential at the first terminal of the capacitive element C1 then rises to the external supply voltage Vcc.

Subsequently when the first inverter circuit 3 delivers an H level (positive α volt) signal when the first gate transistor T1 is off, the potential at the first terminal of the first capacitive element C1 rises to a primary boosted voltage V1 which is equal to Vcc+α, where "α" represents the external supply voltage Vcc. Thus, the first inverter circuit 3 operates on the external supply voltage Vcc, which is then supplied as an H level signal to the first capacitive element C1.

When the second inverter circuit 4 delivers an L level signal when the third gate transistor T3 is off, the second capacitive element C2 is charged in response to the turn-on of the second gate transistor T2, and the potential at the first terminal of the capacitive element C2 rises to the primary boosted voltage V1 which is equal to Vcc+α.

Subsequently, when the second inverter circuit 4 delivers an H level (positive α) signal when the second gate transistor T2 is off, the potential at the first terminal of the second capacitive element C2 rises to a secondary boosted voltage V2 which has the predetermined voltage α added to the primary boosted voltage or V1+α=Vcc+2α. The second inverter circuit 4 also operates on the external supply voltage Vcc, which is then supplied as an H level signal to the second capacitive element C2.

Subsequently, when the third gate transistor T3 is turned on, the secondary boosted voltage V2 which has charged the second capacitive element C2 is supplied to various internal circuits as an internal bus voltage Vout. Thus, the charge pump circuit 100 produces the internal bus voltage Vout by boosting the external supply voltage Vcc by 2α. By repeating the described boosting operation, the charge is stored across the stabilizing capacitive element C0 to raise the potential of the internal bus voltage source Vout.

It is to be noted, however, that the external supply voltage Vcc supplied to the charge pump circuit 100 has different levels between the normal voltage mode and the low voltage mode. The charge pump circuit 100 has a boosting efficiency which changes greatly with a variation in the external supply voltage Vcc. The lower the external supply voltage Vcc, the more rapidly the booster efficiency is degraded. Circuit parameters (capacitances of the first and second capacitive elements C1, C2) of the charge pump circuit 100 are chosen on the basis of the low voltage mode so that no difficulty is caused by an insufficient booster efficiency which prevails in the low voltage mode.

However, when the circuit parameters of the charge pump circuit 100 are chosen on the basis of the low voltage mode, an excessive booster capability results when the external supply voltage is high as in the normal voltage mode which is assumed during a read/write operation, causing an undesirable increase in the power dissipation.

To reduce the power dissipation in the normal voltage mode, the second and third gate transistors T2, T3 are turned on simultaneously after the first booster stage 1 has produced the primary boosted voltage V1, thus effecting a single stage booster pumping, which means delivering the primary boosted voltage V1 as the internal bus voltage Vout, rather than boosting the primary boosted voltage in the second booster stage 2 while maintaining an output from the second inverter circuit 4 at its L level. In contrast to the single stage booster pumping, the term "two stage booster pumping" refers to combining the booster operations in both the first and second booster stages 1, 2 to deliver the secondary boosted voltage V2 as the internal bus voltage Vout.

In the single stage booster pumping, the primary boosted voltage V1 produced by the first booster stage 1 is delivered as the internal bus voltage Vout via the second and third gate transistors T2, T3. Thus, a flow of the charge via the second and third gate transistors T2, T3 produces a voltage drop or a current drop therein, resulting in a decrease in the booster efficiency. More specifically, the second and third gate transistors T2, T3 are formed by PMOS transistors, which do not produce a voltage drop across their sources and drains in a d.c. operation. However, because the transistors T2, T3 are connected in series, they exhibit an increased effective channel length. This prevents the charge discharged from the first capacitive element C1 in an a.c. operation from being delivered in its entirety from the third gate transistor T3, causing a voltage drop or a reduction in the booster efficiency. The booster efficiency of the charge pump circuit 100 is also degraded by an unnecessary charging of the second capacitive element C2. The same is true in the case of an alternate form of single stage booster pumping in which the first booster stage 1 remains quiescent while the second booster stage 2 operates as a charge pump.

In addition, it is essential that the circuit parameters of the charge pump circuit 100 be predetermined increased values in order to enhance the boost capability. However, an increase in the capacitance of the first and second capacitive elements lead to an increase in the chip area and a consequent increase in the size of the semiconductor device and its cost.

On the other hand, the charge pump circuit of the type described requires a determination of optimal circuit parameters. Optimal circuit parameters as well as a timing to switch from the low to the normal voltage mode or vise-versa are determined from previous accurate measurements of various responses of the boosted voltages during each of the single stage and the two stage booster pumping control. This requires that tests be conducted to determine the response of the internal bus voltage Vout with respect to the external supply voltage Vcc during both the two stage and the single stage booster pumping operation.

It is an object of the present invention to provide a voltage conversion circuit which performs an efficient booster operation in accordance with the level of an external supply voltage.

It is another objective of the present invention to provide a voltage conversion circuit which facilitates the determination of optimal circuit parameters.

SUMMARY OF THE INVENTION

To achieve the above objective, the present invention provides a charge pump circuit comprising: a plurality of voltage conversion stages connected between an input supply and a supply output; a plurality of gate transistors, each connected between respective voltage conversion stages, between a first stage of said voltage conversion stages and the input supply, or between last stage of said voltage conversion stages and the supply output; and bypass transistor connected between one of the input supply and the supply output and one of said voltage conversion stages, the bypass transistor connected in parallel with at least one of said gate transistors.

The present invention further provides a charge pump circuit comprising: a pair of charge pumps connected in parallel to each other between an input supply and a supply output, wherein each charge pump includes: a plurality of voltage conversion stages connected between the input supply and the supply output, a plurality of gate transistors, each connected between respective voltage conversion stages, between a first stage of said the voltage conversion stages and the input supply, or between last stage of said voltage conversion stages and the supply output; and a bypass transistor connected between one of the input supply and the supply output and one of said voltage conversion stages, the bypass transistor connected in parallel with at least one of said gate transistors.

The present invention provides a method of driving a charge pump circuit having a plurality of voltage conversion stages connected between an input supply and a supply output, a plurality of gate transistors, each connected between respective voltage conversion stages, between a first stage of said voltage conversion stages and the input supply, or between last stage of said voltage conversion stages and the supply output, and a bypass transistor connected between one of the input supply and the supply output and one of the voltage conversion stages, the bypass transistor connected in parallel with at least one of said gate transistors, the method comprising the steps of: operating all of the voltage conversion stages and the gate transistors in a predetermined sequence while maintaining the one or more bypass transistors off to cause all of the voltage conversion stages to convert the voltage of the input supply to a first voltage for the supply output; and operating at least one of the voltage conversion stages, at least one of the gate transistors and at least one of the bypass transistors in a predetermined sequence to cause at least one of the voltage conversion stages to convert the voltage of the input supply to a second voltage for the supply output.

The present invention further provides a voltage conversion circuit comprising: a charge pump circuit including a plurality of voltage conversion stages connected between an input supply and a supply output, a plurality of gate transistors, each connected between respective voltage conversion stages, between a first stage of said voltage conversion stages and the input supply, or between last stage of said voltage conversion stages and the supply output, and a bypass transistor connected between one of the input supply and the supply output and one of said voltage conversion stages, the bypass transistor connected in parallel with at least one of said gate transistors; a drive circuit connected to the plurality of voltage conversion stages, the plurality of gate transistors and the one or more bypass transistors for controlling the plurality of voltage conversion stages, the plurality of gate transistors, and the one or more bypass transistors; and a mode switching circuit connected to the drive circuit for providing a mode signal to the drive circuit.

Other aspects and advantages of the invention will become apparent from the following description, taken in conjunction with the accompanying drawing, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3(a) to 3(h) are waveform diagrams illustrating the operation of the embodiment shown in FIG. 2 in a two stage booster pumping mode;

FIGS. 4(a) to 4(h) are waveform diagrams illustrating the operation of the embodiment shown in FIG. 2 in a single stage booster pumping mode;

DETAILED DESCRIPTION OF THE PREFERRED EMBODIMENTS

Figure 2:
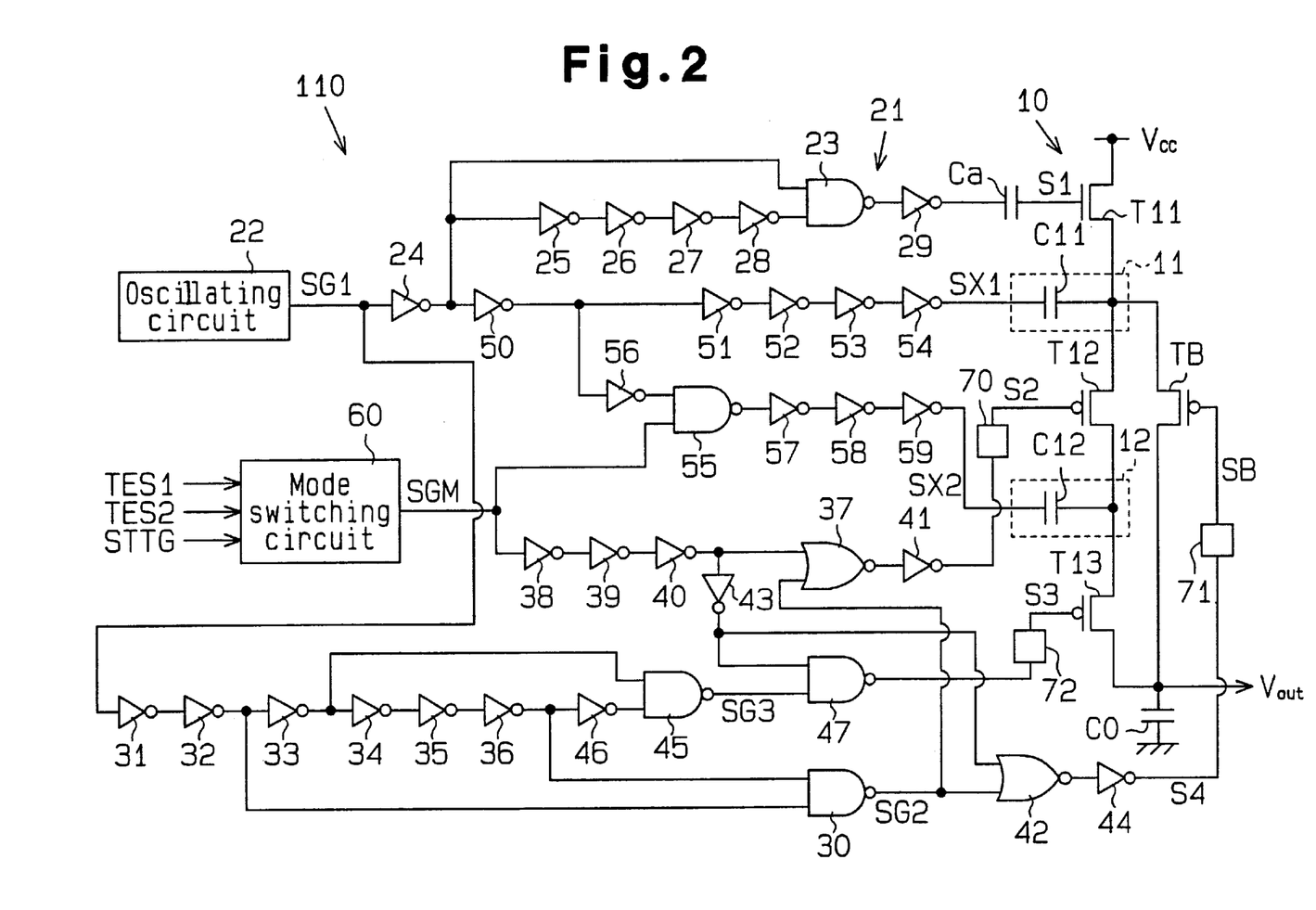
FIG. 2 is a circuit diagram of a voltage conversion circuit according to a first embodiment of the present invention.

Referring to FIG. 2, a voltage conversion circuit 110 according to a first embodiment of the invention will now be described. The voltage conversion circuit 110 may provided within a semiconductor device, such as synchronous dynamic random access memory (SDRAM).

As shown in FIG. 2, the voltage conversion circuit 110 comprises a charge pump circuit 10, a drive circuit 21 which drives the charge pump circuit 10 and a mode switching circuit 60 connected to the drive circuit 21.

The charge pump circuit 10 comprises first and second booster stages 11, 12 which are used for voltage conversion, first, second and third gate transistors T11, T12 and T13, and a bypass transistor TB. The first booster stage 11 is connected to a supply line which supplies an external supply voltage Vcc via the first gate transistor T11 which is formed by an NMOS transistor. It should be noted that the external supply voltage Vcc has different levels, namely a normal voltage mode for when the SDRAM is in use and a low voltage mode for when the SDRAM is not in use. Specifically, the external supply voltage Vcc during the normal voltage mode has a level which is higher than the low voltage mode level.

The first and second booster stages 11, 12 are connected together via the second gate transistor T12 which is formed by a PMOS transistor. The second booster stage 12 is connected to an internal bus, not shown, which supplies an internal supply voltage Vout to various circuits, not shown, via the third gate transistor T13 which is formed by a PMOS transistor. A stabilizing capacitive element C0 is connected to the internal bus for charging it with the charge supplied from the charge pump circuit 10. In the present embodiment, the voltage conversion circuit 110 receives the external supply voltage Vcc as an input voltage and produces the internal supply voltage Vout as a converted and boosted voltage.

The first booster stage 11 comprises a first capacitive element C11 having a first terminal connected to the source terminals of the first and second gate transistors T11, T12, and a second terminal connected to the drive circuit 21.

The second booster stage 12 comprises a second capacitive element C12 having a first terminal connected to the drain terminal of the second gate transistor T12 and a source terminal of the third gate transistor T13, and a second terminal connected to the drive circuit 21.

The bypass transistor TB preferably comprises a PMOS transistor, and includes a source terminal connected to the source terminal of the second gate transistor T12 and a drain terminal connected to the drain terminal of the third gate transistor T13. The bypass transistor TB is turned on and off by the drive circuit 21 in a similar way as the first to the third gate transistors T11 to T13.

Figure 3A:
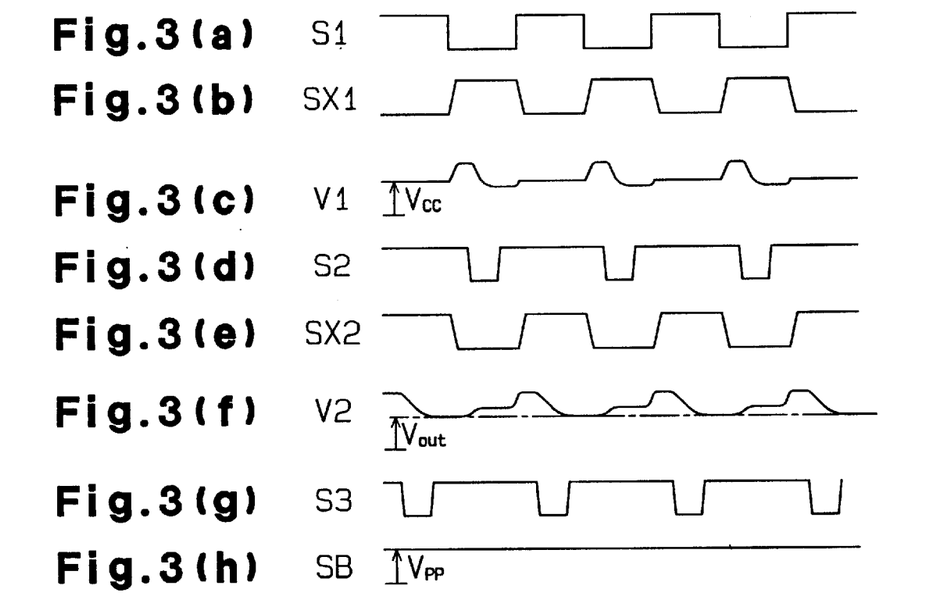
Figure 4A:
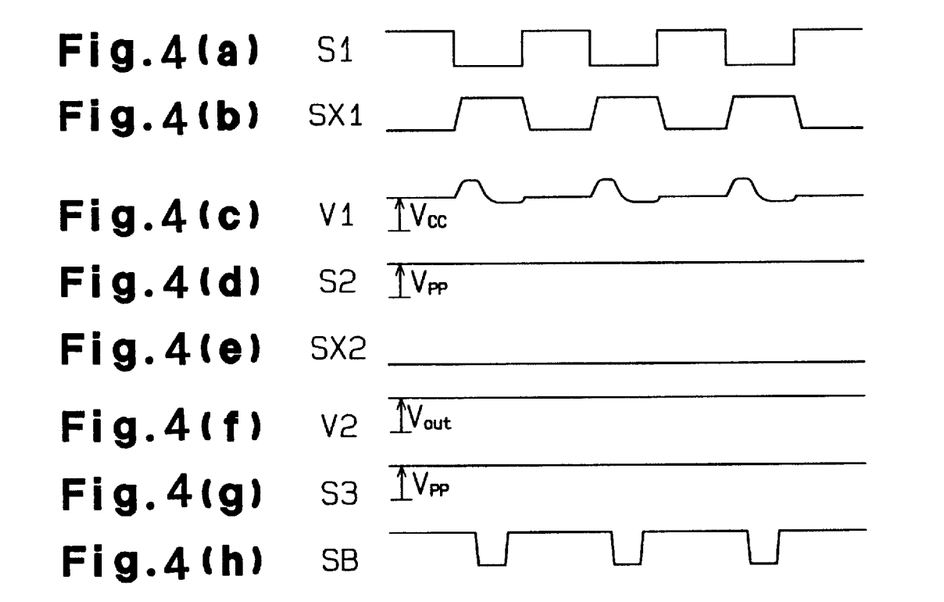

Referring to FIGS. 3 and 4, the operation of the charge pump circuit 10 driven by the drive circuit 21 will be described. The charge pump circuit 10 operates in both the low voltage mode and the normal voltage mode.

Low voltage mode

In the low voltage mode, the charge pump circuit 10 causes the first and second booster stages 11, 12 to operate in a similar manner, thus achieving a so-called two stage booster pumping operation. During the two stage booster pumping operation, the bypass transistor TB is maintained off.

A first control signal S1 as shown in FIG. 3(a) is applied to the gate of the first gate transistor T11, and a second control signal S2 is applied to the gate of the second gate transistor T12. As shown in FIG. 3(d), the second control signal S2 is maintained at its L level for a predetermined interval within the period when the first control signal S1 is at an L level. A third control signal S3 is applied to the gate of the third gate transistor T13, and is maintained at its L level for a predetermined interval when both the first and second control signals S1, S2 are at the H level, as shown in FIG. 3(g). A bypass control signal SB is applied to the gate of the bypass transistor TB and is normally at its H level, during the low voltage mode or during the two stage pumping operation, as shown in FIG. 3(h).

The H level of the first control signal S is determined in consideration of the threshold voltage Vth of the first gate transistor T11. Specifically, the H level of the first control signal S1 is set to be equal to or above the sum of the external supply voltage Vcc and the threshold voltage Vth so that the first terminal of the capacitive element C11 assumes a potential V1 which is equal to the external supply voltage Vcc. During the normal voltage mode, the H level of the first control signal S1 is set in a similar manner as during the low voltage mode.

On the other hand, the H levels of the second and third control signals S2, S3 and the bypass control signal SB are not equal to the external supply voltage Vcc, but are set up at the same level or voltage Vpp as the internal supply voltage Vout which is obtained by the booster operation of the charge pump circuit 10. This is because it is required that the second and third control signals S2, S3 and the bypass control signal SB reliably turn the transistors T12, T13 and TB off. During the normal voltage mode, the H level of the second and third control signals S2, S3 and the bypass control signal SB is set up in the same manner as in the low voltage mode.

The first capacitive element C11 of the first booster stage 11 receives a first boosting signal SX1. As shown in FIG. 3(b), the first boosting signal SX1 assumes an H level when the first control signal S1 is at its L level and assumes an L level when the first control signal S1 is at its H level. The second capacitive element C12 of the second booster stage 12 receives a second boosting signal SX2. As shown in FIG. 3(e), the second boosting signal SX2 assumes an H level when the first boosting signal SX1 is at its L level, and assumes an L level when the first boosting signal SX1 at its H level.

When the first gate transistor T11 is turned on in response to the first control signal S1 having a high level, a charging operation of the first capacitive element C11 begins in accordance with the external supply voltage Vcc. As shown in FIG. 3(c), the first capacitive element C11 is charged until the potential V1 at its first terminal assumes the external supply voltage Vcc.

When the potential V1 of the first capacitive element C11 rises to the external voltage Vcc, the first control signal S1 falls to its L level, whereupon the first boosting signal SX1 rises to its H level (positive α). In response to the first boosting signal SX1 having a high level, the potential V1 of the first capacitive element C11 rises to a level (Vcc+α) or to the external supply voltage Vcc plus the predetermined voltage a. Thus, the first capacitive element C11 receives the first boosting signal SX1 from an inverter circuit 54 described below. The inverter circuit 54 operates on the external supply voltage Vcc, which is supplied as the first boosting signal SX1 having a high level to the first capacitive element C11.

The second gate transistor T12 is turned on in response to the second control signal S2 having a low level. The second capacitive element C12 then begins to be charged, and the potential V2 at the first terminal of the second capacitive element C12 rises to the potential V1 (Vcc+α) at the first terminal of the first capacitive element C11.

When the second boosting signal SX2 rises to its H level (positive α) after the second gate transistor T12 is turned off, the potential V2 at the first terminal of the second capacitive element C12 rises to a level of V1+α=Vcc+2α, or to the potential V1 of the first capacitive element C11 to which the predetermined voltage α is added. Thus, the second capacitive element C12 receives the second boosting signal SX2 having a high level from an inverter circuit 59 which will be described later. The inverter circuit 59 operates on the external supply voltage Vcc, which is supplied as the second boosting signal SX2 having a high level to the second capacitive element C12.

Finally, the third gate transistor T13 is turned on in response to the third control signal S3 having a low level, and the voltage V2 (Vcc+2α) obtained as a result of the charging of the second capacitive element C12 is provided to the various internal circuits as the internal supply voltage Vout.

The charge pump circuit 10 operates to produce the internal supply voltage Vout formed by boosting the external supply voltage Vcc by an amount corresponding to 2α, and delivers the boosted internal supply voltage Vout by repeating the described booster operation.

Normal Voltage Mode

In this mode, the charge pump circuit 10 operates only the first booster stage 11, or effects a so-called single stage booster pumping operation. During the single stage booster pumping operation, the second and third gate transistors T12, T13 are maintained off, and the bypass transistor TB is turned on and off.

The first control signal S1 which is similar to that used during the two stage booster pumping operation as illustrated in FIG. 4(a) is applied to the gate of first gate transistor T11. As shown in FIG. 4(d) and FIG. 4(g), the second and third signals S2, S3 which are applied to the second and third gate transistors T12, T13, respectively, are maintained at their H level. As shown in FIG. 4(h), the bypass control signal SB is maintained at its L level for a predetermined interval when the first control signal S1 is at its L level.

As shown in FIG. 4(b), the first boosting signal SX1 operates the same as during the two stage booster pumping operation. As shown in FIG. 4(e), the second boosting signal SX2 is maintained at its L level (0 volt).

When the first gate transistor T11 is turned on in response to the first control signal S1 having a high level, the first capacitive element C11 begins to be charged in accordance with the external supply voltage Vcc and assumes a high level. The potential V1 at the first terminal of the capacitive element C11 rises to the level of the external supply voltage Vcc.

When the potential V1 rises to the level of the external supply voltage Vcc, the first control signal S1 then falls to its L level, whereupon the first boosting signal SX1 rises to its H level (positive α). The potential V1 at the first terminal of the first capacitive element C11 rises to a level (Vcc+α) or to the sum of the external supply voltage Vcc and the predetermined voltage a in response to the first boosting signal SX1 having a high level.

Subsequently, when the bypass control signal SB falls to its L level for a predetermined interval, the bypass transistor TB is turned on, and the voltage V1 (which is equal to Vcc+α), obtained by the charging of the first capacitive element C11, is supplied to the various internal circuits as the internal voltage Vout.

Thus, during the normal voltage mode, the charge pump circuit 10 produces the internal supply voltage Vout by boosting the external supply voltage Vcc which then assumes a high voltage level by an amount corresponding to a predetermined voltage a, and delivers the internal supply voltage Vout by repeating the described boosting operation.

At this time, the primary boosted voltage V1 (which is equal to Vcc+α) produced by the first booster stage 11 is delivered as the internal supply voltage Vout via only one bypass transistor TB. As a consequence, a voltage drop or a current drop when the boosted voltage V1 is delivered is reduced in comparison to the prior art arrangement in which the charge is transferred via a plurality of gate transistors, such as the second and third transistors T2, T3. Consequently, the efficiency of the charge pump circuit 10 is improved.

Returning to FIG. 2, the drive circuit 21 which produces the signals S1 to S3, SB, SX1 and SX2 to control the charge pump circuit 10 will be described.

The drive circuit 21 comprises an oscillating circuit 22, a plurality of logical elements 23 to 59 and level shifters 70 to 72. The oscillating circuit 22 delivers an oscillating pulse signal SG1 in the form of rectangular waves having a predetermined period. The voltage conversion circuit 110 includes a voltage detector circuit, not shown, which detects the value of the internal supply voltage Vout. The oscillating circuit 22 ceases to oscillate the oscillating signal SG1 when the voltage detector circuit detects that the internal supply voltage Vout has exceeded a predetermined reference value in respective voltage mode.

A first NAND circuit 23 has a first input which is connected to the oscillating circuit 22 via an inverter circuit 24, and a second terminal which is connected to the oscillating circuit 22 via five inverter circuits 24 to 28. The oscillating pulse signal SG1 which is inverted and delayed by the inverter circuit 24 is applied to the first terminal of the first NAND circuit 23 while the oscillating pulse signal SG1 which is inverted and delayed by the inverters 24 to 28 is applied to the second terminal of the first NAND circuit 23. Thus, when the oscillating pulse signal SG1 rises from its L level to its H level, the first NAND circuit 23 generates an H level signal. In response to the low level of the oscillating pulse signal SG1, the first NAND circuit 23 delivers an output signal having a low level which is delayed by a delay time determined by the inverter circuits 25 to 28. The first NAND circuit 23 has an output terminal which is connected to the gate terminal of the first gate transistor T11 via an inverter circuit 29 and a boosting capacitive element Ca. An output signal from the first NAND circuit 23 is inverted by the inverter circuit 29, and the inverted signal is applied as the first control signal S1 to the gate terminal of the first gate transistor T11. Accordingly, the first control signal S1 is substantially synchronized with the oscillating pulse signal SG1.

Since the inverter circuit 29 operates on the external supply voltage Vcc to deliver an H level signal, the capacitive element Ca boosts the output signal from the inverter circuit 29, thus applying the boosted output signal to the first gate transistor T11. Accordingly, the potential or the H level of the first control signal S1 is equal to or greater than the sum of the external supply voltage Vcc and the threshold voltage Vth of the first gate transistor T11.

A second NAND circuit 30 has a first input terminal which is connected to the oscillating pulse signal SG1 via six inverter circuits 31 to 36, and a second input circuit connected to the oscillating pulse signal SG1 via the inverter circuits 31, 32. The oscillating pulse signal SG1 which is delayed by the inverter circuits 31 to 36 is applied to the first input terminal of the second NAND circuit 30 while the oscillating pulse signal SG1 which is delayed by the inverter circuits 31, 32 is applied to the second terminal of the second NAND circuit 30. The second NAND circuit 30 delivers a signal SG2 having a low level having a delay time which is determined by the inverter circuits 33 to 36 in response to the high level of the oscillating pulse signal SG1. The second NAND circuit 30 also delivers a signal SG2 having a high level having a delay time which is determined by the inverter circuits 31, 32 in response to the low level of the oscillating pulse signal SG1.

A first NOR circuit 37 has a first input terminal which is connected to a series of inverter circuit 38 to 40, and a second input terminal connected to the output terminal of the first NAND circuit 30. A signal SG2 from the second NAND circuit 30 is applied to the second input terminal of the first NOR circuit 37, while a mode signal SGM from a mode switching circuit 60 is applied to the first terminal of the first NOR circuit 37 via the inverter circuit 38 to 40. An inverter circuit 41 and a level shifter 70 are connected in series between the first NOR circuit 37 and the gate of the second gate transistor T12. The mode switching circuit 60 delivers a mode signal SGM having a high level during the low voltage mode or during the two stage booster pumping operation and delivers a mode signal SGM having a low level during the normal voltage mode or during a single stage booster pumping operation. During the low voltage mode, the first NOR circuit receives the mode signal SGM having a low level and the signal SG2, and delivers an inverted signal SG2 to the inverter circuit 41. During the normal voltage mode, the first NOR circuit 37 receives the mode signal SGM having a high level, and delivers an L level signal to the inverter circuit 41 independent of the level of the signal SG2.

The inverter circuit 41 receives the signal from the first NOR circuit 37, and inverts such signal before delivering the inverted signal to the level shifter 70. The level shifter 70 converts the level of the inverted signal from the inverter 41, and produces and applies the second control signal S2, which is in phase with the inverted signal from the inverter circuit 41, to the gate of the second gate transistor T12. More specifically, upon receiving an H level signal, the level shifter 70 converts the H level signal into a voltage Vpp having substantially the same level as the internal supply voltage Vout, thus producing the second control signal S2.

Accordingly, during the two stage booster pumping operation, the level shifter 70 applies the second control signal S2 which is in phase with the signal SG2 from the second NAND circuit 30 to the gate of the second gate transistor T12. Thus, the second control signal S2 falls to its L level with a predetermined delay time with respect to the timing when the first control signal S1 falls. On the other hand, the second control signal S2 rises to its H level by a predetermined time interval earlier than the first control signal S1 rises to its H level. During the single stage booster pumping operation, the second control signal S2 is maintained at its H level while the second gate transistor T12 is maintained off.

A second NOR circuit 42 has a first input terminal which is connected to the first input terminal of the first NOR circuit 37 via an inverter circuit 43, thus receiving the mode signal SGM from the mode switching circuit 60 via four inverters 38 to 40 and 43. The second NOR circuit 42 also has a second input terminal which is connected to the output terminal of the second NAND circuit 30 to receive the signal SG2 from the second NAND circuit 30. An inverter circuit 44 and a level shifter 71 are connected in series between the output terminal of the second NOR circuit 42 and the gate of the bypass transistor TB. During the single stage booster pumping operation, an L level signal is applied to the first input terminal while the signal SG2 is applied to the second input terminal of the second NOR circuit 42, thus providing the inversion of the signal SG2 to the inverter circuit 44. On the other hand, during the two stage booster pumping operation, an H level signal is applied to the first input terminal of the second NOR circuit 42, and an L level signal is supplied from the second NOR circuit 42 to the inverter circuit 44 independently from the level of the output signal SG2.

The level shifter 71 converts the level of the inverted signal from the inverter circuit 44, and delivers a bypass control signal SB which is in phase with the inverted signal from the inverter circuit 44 to the bypass transistor TB. Upon receiving an H level signal from the inverter circuit 44, the level shifter 71 converts the H level voltage into a voltage Vpp of substantially the same level as the internal supply voltage Vout.

Accordingly, during the single stage booster pumping operation, the level shifter 71 applies the bypass control signal SB which is in phase with the signal SG2 from the second NAND circuit 30 to the gate of the bypass transistor TB. In other words, the bypass control signal SB falls to its L level with a predetermined delay time after the first control signal S1 has fallen to its L level, but rises to its H level by a predetermined time interval earlier than the first control signal S1 rises to its H level. However, during the two stage booster pumping operation, the bypass control signal SB is maintained at its H level, whereby the bypass transistor TB is maintained off.

A third NAND circuit 45 has a first input terminal connected to the output of the inverter circuit 33, and a second input terminal connected to the output terminal of an inverter circuit 46. An oscillating pulse signal SG1 having a delay time which is determined by the inverter circuits 31 to 33 is applied to the first input terminal of the third NAND circuit 45 while an oscillating pulse signal SG1 having a delay time which is determined by the inverter circuits 31 to 36 and 46 is applied to the second input terminal of the third NAND circuit 45. In response to the rising edge of the oscillating pulse signal SG1, the third NAND circuit 45 delivers a signal SG3 having a high level with a time delay which is determined by the inverter circuits 31 to 33. In response to the falling edge of the oscillating pulse signal SG1, the third NAND circuit 45 delivers a signal SG3 having a low level with a time delay which is determined by the inverter circuit 34 to 36 and 46.

A fourth NAND circuit 47 has a first input terminal connected to the output terminal of the inverter circuit 43, a second input terminal connected to the output terminal of the third NAND circuit 45, and an output terminal connected to the third gate transistor T13 via a level shifter 72. The mode signal SGM from the mode switching circuit 60 is applied to the first input terminal of the fourth NAND circuit 47 via the inverter circuits 38 to 40 and 43 while the signal SG3 is applied from the third NAND circuit 45 to the second input terminal of the fourth NAND circuit 47.

In the low voltage mode, an H level signal is applied to the first input terminal of the fourth NAND circuit 47, such that an inversion of the signal SG3 is supplied to the level shifter 72. In the normal voltage mode, an L level signal is applied to the first input terminal of the fourth NAND circuit 47, and an H level signal is always supplied to the level shifter 72 independent of the level of the signal SG3.

The level shifter 72 translates the level of the signal from the fourth NAND circuit 47, thus supplying the third control signal S3 which is in phase with the signal from the fourth NAND circuit 47 to the gate of the third gate transistor T13. Specifically, upon receiving an H level signal, the level shifter 72 converts a voltage having the H level into a voltage Vpp of substantially the same level as the internal supply voltage Vout.

Accordingly, during the two stage booster pumping operation, the level shifter 72 delivers the third control signal S3 which is in phase with the signal SG3 from the third NAND circuit 45 to the third gate transistor T13. The third control signal S3 falls with a predetermined delay time after the second control signal S2 rises, and rises to its H level by a predetermined time interval earlier than the falling edge of the first control signal S1 which falls earlier than the second control signal S2. On the other hand, during the single stage booster pumping operation, the third control signal S3 is maintained at its H level, and the third gate transistor T13 is maintained off.

The oscillating circuit 22 is connected to the first capacitive element C11 of the first booster stage 11 via six inverter circuits 24 and 50 to 54. The oscillating pulse signal SG1 from the oscillating circuit 22 is supplied to the first capacitive element C11 via the inverter circuits 22 and 50 to 54. A signal from the last inverter circuit 54 is applied as the first boosting signal SX1 to the first capacitive element C11. Accordingly, the first boosting signal S1 from the inverter circuit 54 is in phase with the oscillating pulse signal SG1. On the other hand, the first boosting signal SX1 falls as the first control signal S1 rises and rises as the first control signal S1 falls.

A fifth NAND circuit 55 has a first input terminal connected to the output terminal of the inverter circuit 50 via an inverter circuit 56, a second input terminal which is connected to the mode switching circuit 60, and an output terminal which is connected to the second capacitive element C12 via these inverter circuits 57, 58 and 59. The oscillating pulse signal SG1 is applied to the first input terminal of the fifth NAND circuit 55 via the inverter circuits 24, 50 and 56 and the mode signal SGM from the mode switching circuit 60 is applied to the second input terminal of the fifth NAND circuit 55. During the two stage booster pumping operation, the fifth NAND circuit 55 delivers a signal which is in phase with the oscillating pulse signal SG1 while during the single stage booster pumping operation, it always delivers an H level signal.

A signal from the fifth NAND circuit 55 is supplied to the second capacitive element C12 of the second booster stage 12 via the three inverter circuits 57 to 59. The second capacitive element C12 receives the signal from the last stage inverter 59 as the second booster signal SX2.

During the two stage booster pumping operation, the second boosting signal SX2 from the inverter circuit 59 is 180 degrees out of phase with the oscillating pulse SG1, and is in phase with the first control signal S1. Thus, as the first boosting signal SX1 rises, the second boosting signal SX2 falls, and as the first boosting signal SX1 falls, the second boosting signal SX2 rises. On the other hand, during the single stage boosting operation, the inverter circuit 59 always delivers the second boosting signal SX2 having a low level.

Figure 5:
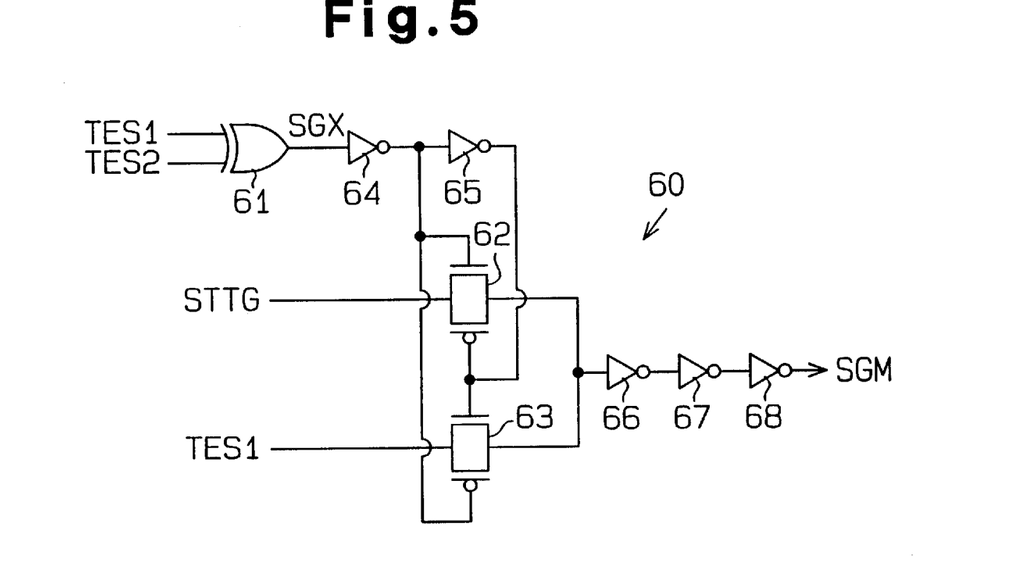
FIG. 5 is a circuit diagram of a mode switching circuit used in the voltage conversion circuit shown in FIG. 2.

Referring to FIG. 5, the mode switching circuit 60 will be described more specifically.

The mode switching circuit 60 comprises an exclusive OR circuit 61, first and second transfer gates 62, 63 and five inverter circuits 64, 65, 66, 67 and 68. The mode switching circuit 60 sets the level of the mode signal SGM in accordance with a mode switching signal STTG during a normal operation. During a test, the mode switching circuit 60 nullifies the mode switching signal STTG and sets up the level of the mode switching signal SGM in accordance with a first test mode signal TES1.

The exclusive OR circuit 61 receives first and second test mode signals TES1, TES2 from an internal circuit, not shown. The SDRAM receives a variety of test mode signals from an external unit, not shown. When the SDRAM receives a test mode signal which is used to test the charge pump circuit 10, an internal circuit within the SDRAM determines the test mode signal to deliver the first and second test mode signals TES1, TES2.

During the normal operation of the charge pump circuit 10, it operates in the single stage or the two stage booster pumping operation in accordance with the level of the external supply voltage Vcc or depending on whether it is in the normal voltage mode or the low voltage mode. In contrast, during the test of the charge pump circuit 10, it operates in either the single stage or the two stage booster pumping operation independent of the level of the external supply voltage Vcc.

When the charge pump circuit 10 operates in the single stage booster pumping mode, independent of the level of the external supply voltage Vcc (hereafter referred to as "fixed single stage booster pumping operation"), the first test mode signal TES2 is set to its H level while the second test mode signal TES2 is set to its L level. When the charge pump circuit 10 operates in the two stage booster pumping operation independent of the level of the external supply voltage Vcc (hereafter referred to as "fixed two stage booster pumping operation"), the first test mode signal TES1 is set to its L level while the second test mode signal TES2 is set to its H level.

When the charge pump circuit 10 operates either in the normal voltage mode or the low voltage mode on the basis of the external supply voltage Vcc, both the first and second test mode signals TES1, TES2 are set to a common level, such as either the H or the L level.

Consequently, in the fixed two stage or fixed single stage booster pumping operation, the exclusive OR circuit 61 receives the first and second test mode signals TES1, TES2 which are of different levels, and delivers a signal SGX having a high level. When operating in either the normal voltage mode or the low voltage mode on the basis of the external supply voltage Vcc, the exclusive OR circuit 61 receives the first and second test mode signals TES1, TES2 having a common level and delivers a signal SGX having a low level. Thus, the exclusive OR circuit 61 delivers the signal SGX having a high level during the test, and delivers the signal SGX having a low level during an operation other than the test of the charge pump circuit 10.

The first transfer gate 62 is preferably formed by a combination of a PMOS transistor and an NMOS transistor, and has an input terminal at which it receives the mode switching signal STTG and an output terminal connected to the inverter circuit 66. The PMOS transistor has its gate connected to the exclusive OR circuit 61 via the inverter circuit 64 to receive the signal SGX. The NMOS transistor has its gate connected to the exclusive OR circuit 61 via the inverter circuits 64 and 65, so that the gate receives the signal SGX.

When the signal SGX is at its L level during the normal operation, the first transfer gate 62 is turned on. The mode switching signal STTG produced by the internal circuit, not shown, is delivered via the first transfer gate 62 and the inverter circuits 66 to 68. The internal circuit detects the voltage level of the external supply voltage Vcc and produces the switching signal STTG having a level which depends on the voltage level. The internal circuit produces the mode switching signal STTG having a high level when the external supply voltage Vcc assumes a high level (as in the normal voltage mode and operating in the single stage booster pumping mode), and produces the mode switching signal STTG having a low level when the external supply voltage Vcc assumes a low level (as in the low voltage mode and operating in the two stage booster pumping mode). Accordingly, the mode signal SGM is set to its H level when the mode switching signal STTG assumes an L level, and is set to its L level when the mode switching signal STTG assumes an H level.

When the signal SGX is at its H level as during the test, the first transfer gate 62 is turned off, whereby the mode switching signal STTG cannot be delivered as the mode signal SGM.

Preferably, the second transfer gate 63 is formed by a combination of a PMOS transistor and an NMOS transistor. The PMOS transistor has its gate connected to the exclusive OR circuit 61 via the inverter circuits 64 and 65 and receives the signal SGX. The NMOS transistor has its gate connected to the OR circuit 61 via the inverter circuit 64 and receives the signal SGX. The second transfer gate 63 has an input terminal at which it receives the first test mode signal TES1, and an output terminal connected to the inverter circuit 66.

When the output signal SGX is at its H level (during the test), the second transfer gate 63 is turned on and the first test mode signal TES1 is delivered as the mode signal SGM via the second transfer gate 63 and the inverter circuits 66 to 68.

Accordingly, the mode signal SGM is set to its L level when the first test mode signal TES1 assumes an H level, and is set to its H level when the first test mode signal TES1 assumes an L level. In other words, when the first test mode signal TES1 is at its H level and the mode signal SGM is at its L level, the charge pump circuit 10 operates in the fixed, single stage booster pumping mode. In contrast, when the first test mode signal TES1 is at its L level and the mode signal SGM at its H level, the charge pump circuit 10 operates in the fixed, two stage booster pumping mode.

When the output signal SGX is at its L level (during the normal operation), the second transfer gate 63 is turned off, so the first test mode signal TES1 cannot be delivered as the mode signal SGM.

Figure 6:
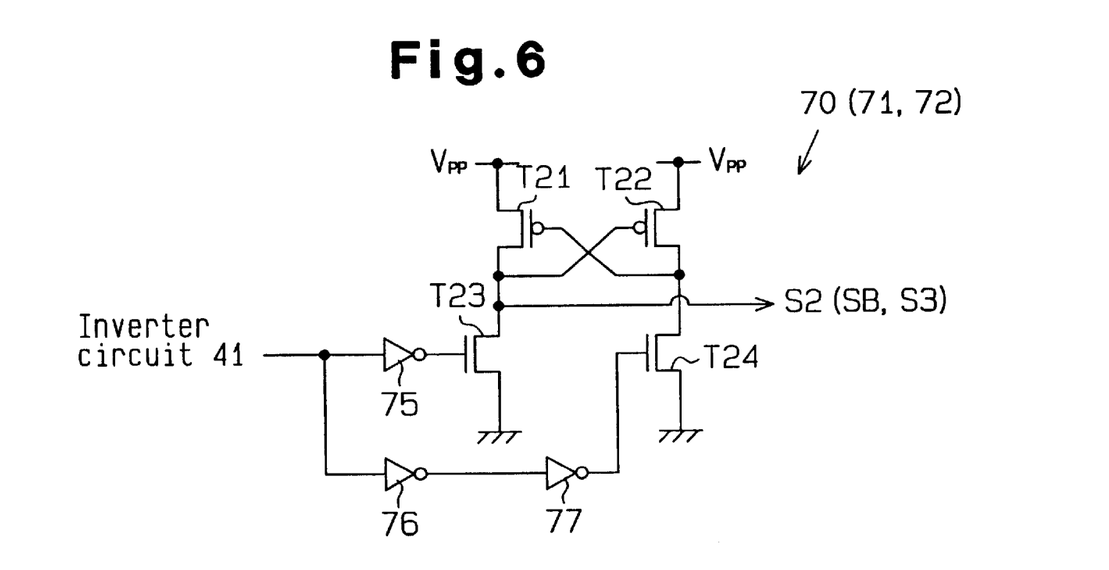
FIG. 6 is a circuit diagram of a level shifter used in the voltage conversion circuit shown in FIG. 2.

Referring to FIG. 6, the level shifters 70, 71 and 72 will be described. Because the level shifters 70, 71 and 72 have identical circuit arrangements, only the level shifter 70 will be described.

The level shifter 70 comprises a pair of PMOS transistors T21, T22, a pair of NMOS transistor T23, T24 and three inverter circuits 75, 76 and 77.

The PMOS transistor T21 has a source terminal connected to a bus which supplies the voltage Vpp, a drain terminal connected to the gate terminal of the PMOS transistor T22 and a gate terminal connected to a drain terminal of the PMOS transistor T22. The drain terminal of the PMOS transistor T21 is connected to the second gate transistor T12 (see FIG. 2), and the PMOS transistor T21 supplies the second control signal S2 to the second gate transistor T12. The PMOS transistor T22 has a source terminal connected to the bus which supplies the voltage Vpp.

The NMOS transistor T23 has a drain terminal connected to the drain terminal of the PMOS transistor T22, a source terminal connected to the ground and a gate terminal connected to the inverter circuit 75. A signal from the inverter circuit 40 (see FIG. 2) is applied to the gate of the NMOS transistor T23 via the inverter circuit 75. The NMOS transistor T24 has drain terminal connected to the drain terminal of the PMOS transistor T22, a source terminal connected to the ground and a gate terminal connected to the inverter circuits 76, 77. A signal from the inverter circuit 41 (see FIG. 2) is applied to the gate of the NMOS transistor T24 via the inverter circuits 76, 77.

The voltage Vpp is produced on the basis of the internal supply voltage Vout which is internally produced by the charge pump circuit 10, and is substantially identical with the internal supply voltage Vout.

When an H level signal which has substantially the same level as the external supply voltage Vcc is delivered from the inverter circuit 41, the NMOS transistor T23 is turned off while the NMOS transistor T24 is turned on. This allows the PMOS transistor T21 to be turned on and the PMOS transistor T22 to be turned off. Accordingly, the drain terminal of the PMOS transistor T21 assumes the level of the voltage Vpp. In other words, the H level of the second control signal S2 is equal to the voltage Vcc.

It will be noted that when an L level signal is delivered from the inverter circuit 41, the NMOS transistor T23 is turned on while the NMOS transistor T24 is turned off. This allows the PMOS transistor T21 to be turned off and the PMOS transistor T22 to be turned on. Accordingly, the potential at the drain terminal of the PMOS transistor T21 is substantially equal to zero.

The operation of the voltage conversion circuit 110 will now be described with reference to FIG. 2. Low voltage mode The mode switching circuit 60 receives the first and second mode signals TES1, TES2 which have substantially the same level, either H or L level, and the mode switching signal STTG having a low level, and generates the mode signal SGM having a high level. An H level signal is supplied to the fourth and fifth NAND circuits 47, 55 while an L level signal is supplied to the NOR circuit 37. An H level signal is supplied to the NOR circuit 40.

Accordingly, the drive circuit 21 produces the first to third control signals Si to S3 and the first and second boosting signals SX1, SX2 in accordance with the oscillating pulse signal SG1 while always producing the fourth control signal S4 having a low level. The first to third control signals S1 to S3 and the first and second boosting signals SX1, SX2 are applied to the first to third gate transistors T11 to T13 and the first and second booster stages 11, 12, respectively, at timings shown in FIG. 3. At this time, the bypass transistor TB is maintained off.

Accordingly, the charge pump circuit 10 performs the two stage booster pumping operation in accordance with the first to the third control signal S1 to S3 and the first and second boosting signals SX1, SX2, thus boosting the supply voltage Vcc having a low level via the two stage booster pumping operation to produce the internal supply voltage Vout.

Normal Voltage Mode

The mode switching circuit 60 receives the first and second test mode signals TES1, TES2 which are at substantially the same level, either H or L level, and the mode switching signal STTG having a high level, and delivers the mode signal SGM having a low level. An L level signal is supplied to the fourth and fifth NAND circuits 47, 55, an H level signal is supplied to the NOR circuit 37 and an L level signal is supplied to the NOR circuit 42.

Accordingly, the drive circuit 21 applies the first control signal S1, the bypass control signal SB and the first boosting signal SX1 to the first gate transistor T11, the bypass transistor TB and the first booster stage 11, respectively, at timings determined by the oscillating pulse signal SG1 (see FIG. 4). In addition, the drive circuit 21 applies the second and third control signals S2, S3 having a high level and the second boosting signal SX2 having a low level to the second and third gate transistors T12, T13 and the second booster stage 12, respectively. Consequently, the second and third gate transistors T12, T13 are maintained off, ceasing the pumping operation of the second booster stage 12.

Accordingly, the charge pump circuit 10 performs the single stage booster pumping operation in accordance with the first control signal S, the bypass control signal SB and the first boosting signal SX1, thus boosting the supply voltage Vcc having a high level via the single stage booster pumping operation to produce the internal supply voltage Vout.

Test Mode: Two Stage Pumping Operation Testing Mode

The mode switching circuit 60 receives the first test mode signal TES1 having a low level and the second test mode signal TES2 having a high level and delivers the mode signal SGM having a high level. The mode signal SGM having a high level deliver from the mode switching circuit 60 does not depend on the level of the mode switching signal STTG.

An H level signal is supplied to the fourth and the fifth NAND circuit 47, 55, and an L level signal is supplied to the NOR circuit 37. An H level signal is supplied to the NOR circuit 42. As a consequence, the drive circuit 21 applies the first to the third control signal S1 to S3 and the first and second boosting signals SX1, SX2 to the first to the third gate transistor T11 to T13 and the first and second booster stages 11, 12, respectively, at timings indicated in FIG. 3, in a similar manner as in the low voltage mode. The bypass transistor TB is maintained off. Accordingly, the charge pump circuit 10 performs the two stage booster pumping operation in accordance with the first to the third control signals S1 to S3 and the first and second boosting signals SX1, SX2.

Figure 7:
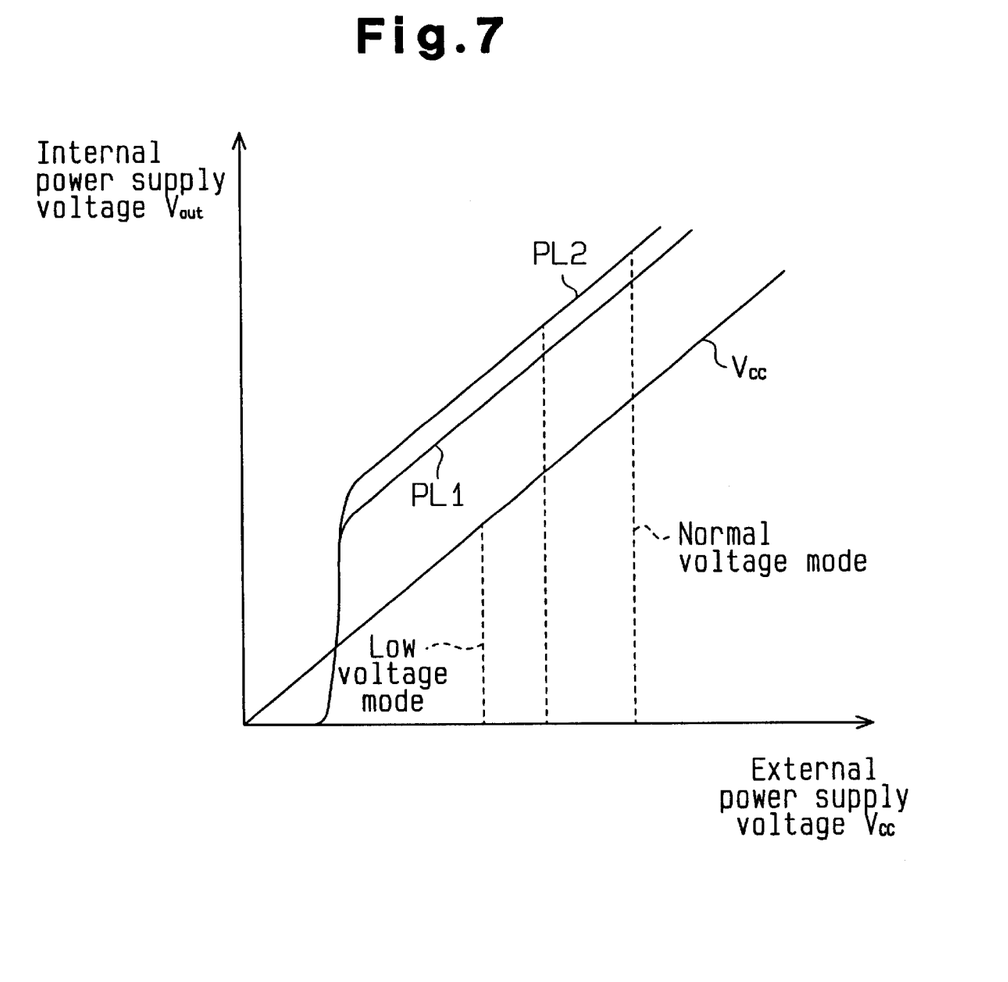
FIG. 7 is a graph showing internal supply voltage versus external supply voltage for the single stage and the two stage pumping operation.

FIG. 7 shows characteristic curve PL2 indicating the internal supply voltage Vout relative to the external supply voltage Vcc in the two stage booster pumping operation. Specifically, the internal supply voltage Vout is determined while increasing the external supply voltage Vcc from to 0 volts to a high voltage.

Test Mode: Single Stage Pumping Operation Testing Mode

The mode switching circuit 60 receives the first test mode signal TES1 having a high level and the second test mode signal TES2 having a low level, and delivers the mode signal SGM having a low level. At this time, the mode signal SGM having a low level does not depend on the level of the mode switching signal STTG.

The drive circuit 20 applies the first control signal S1, the bypass control signal SB and the first boosting signal SX1 to the first gate transistor T11, the bypass transistor TB and the first booster stage 11, respectively, at timings indicated in FIG. 4, in the same manner as in the normal voltage mode. The second and third gate transistors T12, T13 are maintained off while the second booster stage ceases to operate.

Thus, the charge pump circuit 10 performs the single stage booster pumping operation in accordance with the first control signal S1, the bypass control signal SB and the first boosting signal SX1.

FIG. 7 shows characteristic curve PL1 representing the internal supply voltage Vout relative to the external supply voltage Vcc in the single stage booster pumping operation. Specifically, the internal supply voltage Vout is determined while increasing the external supply voltage Vcc from 0 volts to a high voltage.

As described above, in the single stage booster pumping operation, the first booster stage 11 performs a boosting operation while maintaining the second and third gate transistors T12, T13 off. The first gate transistor T11 and the bypass transistor TB are turned on and off, and the voltage which is boosted by charging the first capacitive element C11 is delivered via the bypass transistor TB. In other words, the charge on the first capacitive element C11 is passed via the bypass transistor TB to the internal bus.

Accordingly, the charge which is discharged can be increased in comparison to the prior art arrangement in which the charge is discharged via a pair of gate transistors connected in series. Because no charging operation takes place with respect to the second capacitive element C12 and the booster efficiency is improved.

When the external supply voltage Vcc is low, the two stage booster pumping operation takes place and when the external supply voltage Vcc is high, the single stage booster pumping operation takes place. It will be noted that with a conventional charge pump circuit, the booster efficiency decreases as the external supply voltage Vcc decreases. Since the charge pump circuit 10 of the present embodiment performs the two stage booster pumping operation when the external supply voltage is low, it is a simple matter to produce an intended boosted voltage (or internal supply voltage Vout) from the low external supply voltage Vcc without increasing the capacitance of the capacitive element C11, C12. Because there is no need to increase the capacitance of the capacitive elements C11, C12, a chip area for the provision of the capacitive element C11, C12 can be reduced, allowing a semiconductor device (such as SDRAM) to be scaled down.

In addition to the low voltage mode and the normal voltage mode, the mode switching circuit 60 allows an operation in the test mode which takes place in accordance with the test mode signals TES1 and TES2. The charge pump circuit 10 normally performs either the two stage or single stage booster operation independent of the level of the external supply voltage Vcc.

Accordingly, it is a simple matter to determine the boosted voltage (or the internal supply voltage Vout) relative to the input voltage (or the external supply voltage Vcc) to the charge pump circuit 10 for each of the single stage and the two stage booster pumping operation. Such determination is required for a circuit design of the charge pump circuit 10. It will be noted that the mode switching circuit 60 has a simple circuit arrangement which includes only the exclusive OR circuit 61, the first and second transfer gates 62, 63 and the inverter circuits 64, 65 to enable the test mode. Accordingly,. an increase in the chip is suppressed even if the test mode is incorporated.

Figure 8:
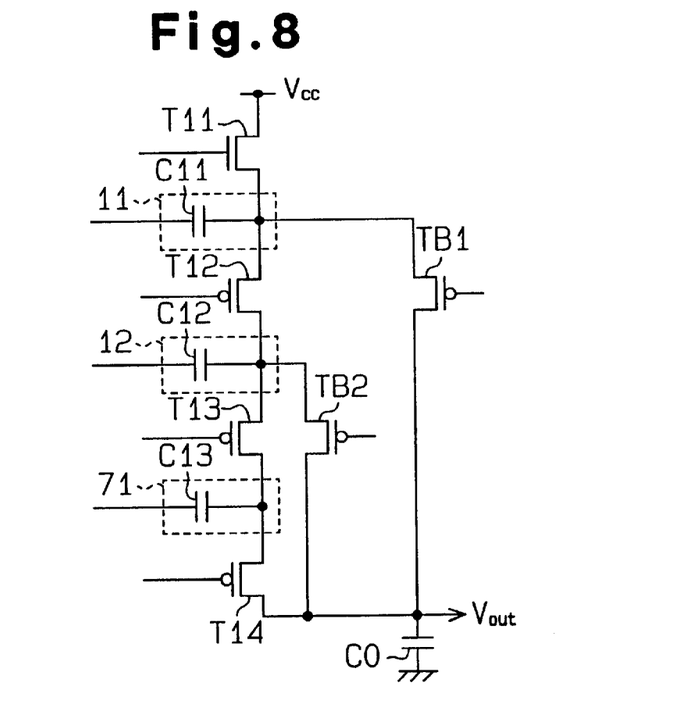
FIG. 8 is a circuit diagram of a charge pump circuit according to a second embodiment of the present invention.

It should be apparent to those skilled in art that the present invention may be embodied in many other specific forms without departing from the spirit or the scope of the invention. Particularly, it should be understood that the invention may be embodied in the following forms:

In addition to the single stage and the two stage booster pumping operation, the charge pump circuit 10 may be modified to provide a three stage booster pump operation. As illustrated in FIG. 8, the charge pump circuit 10 may include a third booster stage 71 including a third capacitive element C13 and a fourth gate transistor T14 formed by a PMOS transistor. The bypass gate transistors TB1, TB2, formed by PMOS transistors, turn the first and second booster stages on and off, allowing one of the single stage to the three stage booster pumping operation to be performed selectively. In this instance, either one of the bypass transistors TB1, TB2 may be omitted. Alternatively, four or more booster stages may be provided to enable a booster pumping operation utilizing four or more stages.

Figure 9:
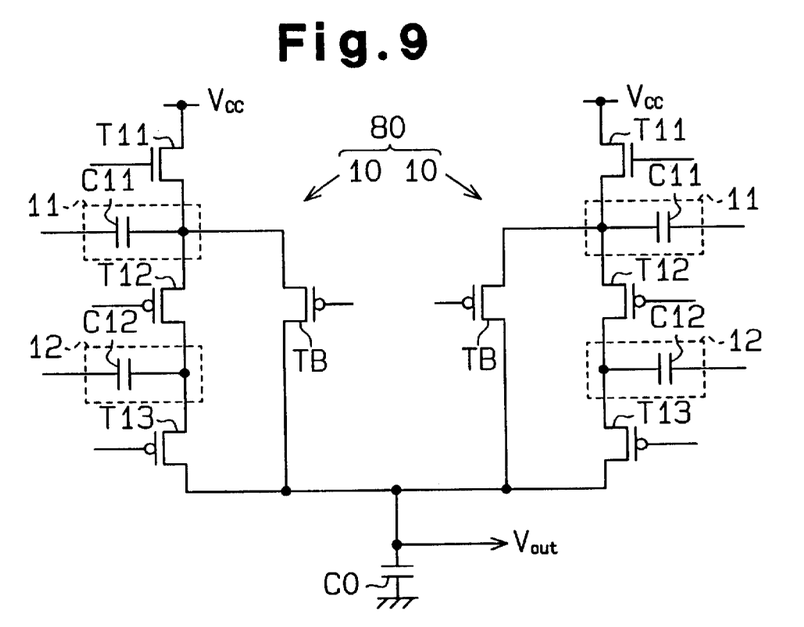
FIG. 9 is a circuit diagram of a charge pump circuit according to a third embodiment of the present invention.

In addition, a charge pump circuit 80 including a pair of charge pump circuits 10 connected in parallel may be provided as shown in FIG. 9. In the charge pump circuit 80, a pair of charge pump circuits 10 alternately deliver the internal supply voltage Vout. In this instance, the drive circuit 21 and the mode switching circuit 60 are provided separately for each of the charge pump circuits 10. The oscillating circuit 22 and the mode switching circuit 60 may be commonly used for both of the charge pump circuits 10. When the pair of charge pump circuits 10 alternately deliver the internal supply voltage Vout, the latter may contain a small ripple. In this instance, each charge pump circuit 10 may include three or more booster stages.

Figure 10:
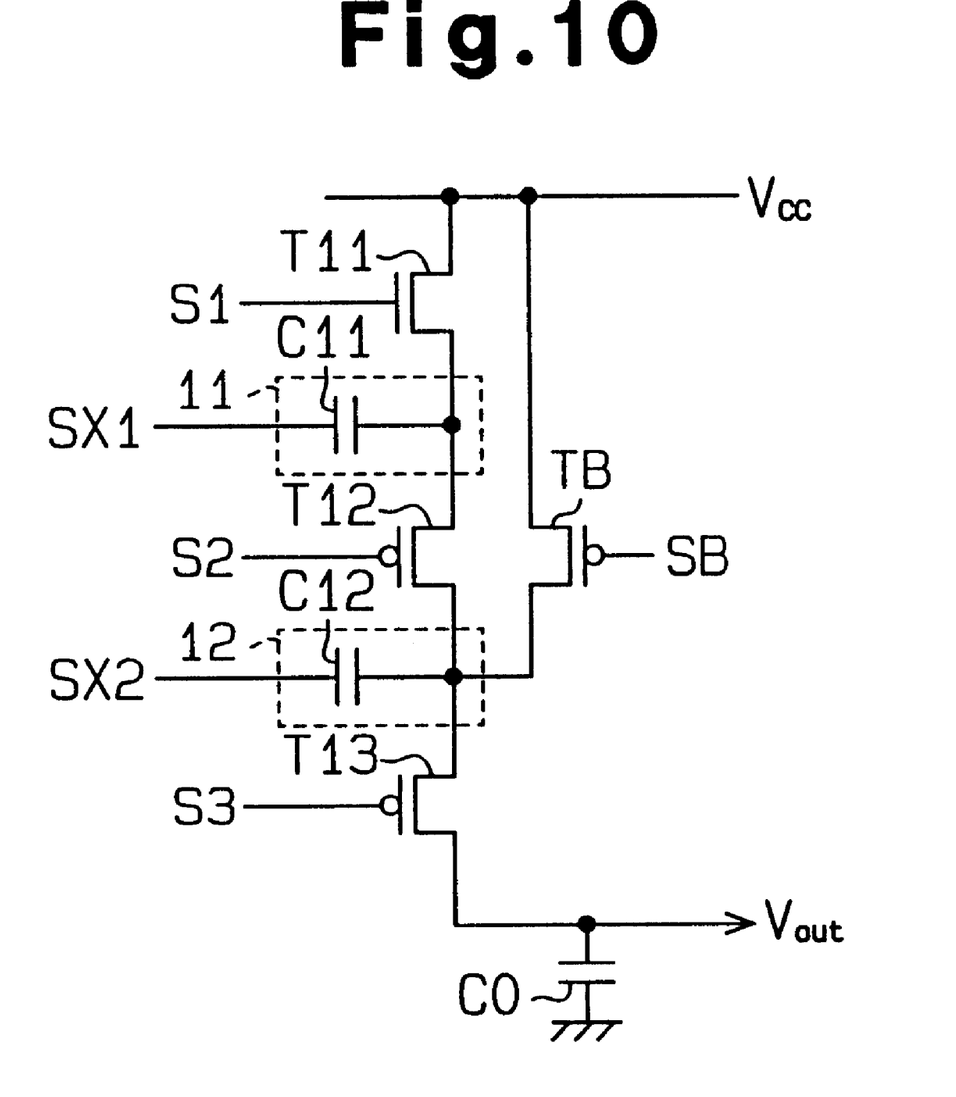
FIG. 10 is a circuit diagram of a charge pump circuit according to a fourth embodiment of the present invention.

As shown in FIG. 10, the bypass transistor TB may be connected between the second capacitive element C2 of the second booster stage 12 and a supply line supplying the external supply voltage Vcc. In this instance, when the single stage booster pumping operation takes place, the first and second gate transistors T11, T12 are turned off, thus ceasing the booster operation by the first capacitive element C11. The bypass transistor TB, the third gate transistor C13 and the second capacitive element C12 are controlled in accordance with the bypass control signal SB, the third control signal S3 and the second boosting signal SX2, respectively. Again, a voltage drop is reduced, improving the voltage boosting efficiency.

The external supply voltage Vcc may have a constant level independent of the single stage or the two stage booster pumping operation. A signal which selects the operation mode may be separately provided.

The charge pump circuit 10 may use step-down stages instead of the booster stages 11, 12, 13. The charge pump circuit 10 may step down an input voltage as referenced to as a substrate voltage, thus providing a voltage lower than the substrate voltage or the negative voltage.

In addition, the charge pump circuit 10 may be provided in a semiconductor device which is separate from a semiconductor device in which at least one of the drive circuit device 21 and the mode switching 60 is provided.

The function to select the test mode may be removed from the mode switching circuit 60. For example, in the arrangement of FIG. 5, the exclusive OR circuit 61, the first and second transfer gates 62, 63 and the inverter circuits 64, 65 within the mode switching circuit 60 may be omitted.

The present examples and the embodiments are to be considered as illustrative and not restrictive and the invention is not to be limited to the details given herein but may be modified within the scope and equivalence of the appended claims.

What is claimed is:

1. A charge pump circuit comprising:
    a plurality of gate transistors, the gate transistors connected in series between a voltage input and a voltage output;
    a plurality of voltage conversion stages, each of said plurality of voltage conversion stages connected to a connection between adjacent gate transistors; and
    a bypass transistor connected between one of the voltage input and the voltage output and one of said voltage conversion stages, the bypass transistor connected in parallel with at least one of said gate transistors.

2. The charge pump circuit according to claim 1, wherein each of the voltage conversion stages comprises a capacitive element.

3. The charge pump circuit according to claim 1, wherein each of the voltage conversion stages includes a booster stage which boosts a potential of the voltage input.

4. The charge pump circuit according to claim 1, wherein the bypass transistor is connected between one of the voltage conversion stages and the voltage output.

5. The charge pump circuit according to claim 1, wherein the plurality of voltage conversion stages includes three voltage conversion stages, and wherein the bypass transistor includes two bypass transistors, a first one of the bypass transistors being connected between a first voltage conversion stage and the voltage output, and a second one of the bypass transistors being connected between another voltage conversion stage and the voltage output.

6. A charge pump circuit comprising:
    a pair of charge pumps connected in parallel to each other between a voltage input and a voltage output, wherein each charge pump includes:
    a plurality of gate transistors, the gate transistors connected in series between the voltage input and the voltage output;
    a plurality of voltage conversion stages, each of said plurality of voltage conversion stages connected to a connection between adjacent gate transistors; and
    a bypass transistor connected between one of the voltage input and the voltage output and one of said voltage conversion stages, the bypass transistor connected in parallel with at least one of said gate transistors.

7. A method of driving a charge pump circuit having a plurality of gate transistors, the gate transistors connected in series between a voltage input and a voltage output;
    a plurality of voltage conversion stages, each of said plurality of voltage conversion stages connected to a connection between adjacent gate transistors and a bypass transistor connected between one of the voltage input and the voltage output and one of the voltage conversion stages, the bypass transistor connected in parallel with at least one of said gate transistors, the method comprising the steps of:
    operating all of the voltage conversion stages and the gate transistors in a predetermined sequence while maintaining the bypass transistor off to cause all of the voltage conversion stages to convert the voltage input to a first voltage for the voltage output; and
    operating at least one of the voltage conversion stages, at least one of the gate transistors and the bypass transistor in a predefined sequence to cause at least one of the voltage conversion stages to convert the voltage of the voltage input to a second voltage for the voltage output.

8. The method according to claim 7, wherein each of the voltage conversion stages comprises a booster stage including a capacitive element, the method further comprising the step of charging and discharging the capacitive elements during the voltage conversion.

9. The method according to claim 7, further comprising the step of switching the bypass transistor in accordance with a voltage of the voltage input.

10. The method according to claim 9, wherein each of the voltage conversion stages comprises a booster stage including a capacitive element, and wherein when the voltage input has a first voltage, all of the booster stages are used in the conversion of the voltage from the voltage input while when the voltage input has a second voltage higher than the first voltage, at least one of the booster stages is used for the conversion of the voltage from the voltage input.

11. A voltage conversion circuit comprising:
a charge pump circuit including:
a plurality of gate transistors, the gate transistors connected in series between a voltage input and a voltage output;
a plurality of voltage conversion stages, each of said plurality of voltage conversion stages connected to a connection between adjacent gate transistors; and
a bypass transistor connected between one of the input voltage and the output voltage and one of said voltage conversion stages, the bypass transistor connected in parallel with at least one of said gate transistors;
a drive circuit connected to the plurality of voltage conversion stages, the plurality of gate transistors and the bypass transistor for controlling the plurality of voltage conversion stages, the plurality of gate transistors, and the bypass transistor; and
a mode switching circuit connected to the drive circuit for providing a mode signal to the drive circuit.

12. The voltage conversion circuit according to claim 11, wherein the mode switching circuit selectively provides a first mode signal which causes all of the voltage conversion stages to operate and a second mode signal which causes at least one of the voltage conversion stages to operate to the drive circuit.

13. The voltage conversion circuit according to claim 12, wherein the drive circuit uses the first mode signal to control the charge pump circuit such that the bypass transistor is turned off while using all of the voltage conversion stages for converting the voltage of the voltage input to a first voltage for the voltage output and uses the second mode signal to control the charge pump circuit such that at least one of the voltage conversion stages is used to convert the voltage of the voltage input to a second voltage of the voltage output.

14. The voltage conversion circuit according to claim 13, wherein the first and second voltages of the voltage output are provided to a semiconductor device operating in a plurality of modes and wherein the mode switching circuit supplies either a first or a second mode signal to the drive circuit in accordance with a particular one of the plurality of modes.

15. The voltage conversion circuit according to claim 12, wherein the mode switching circuit provides the first mode signal to the drive circuit when the voltage of the voltage input assumes a first predetermined voltage and provides the second mode signal to the drive circuit when the voltage input assumes a second predetermined voltage which is higher than the first predetermined voltage.

16. The voltage conversion circuit according to claim 12, wherein the mode switching circuit is responsive to a test mode signal to provide either the first or the second mode signal to the drive circuit in accordance with the test mode signal independent of the voltage level of the input supply.

17. The voltage conversion circuit according to claim 11, wherein the voltage conversion stage comprises a booster stage including a capacitive element.

18. The voltage conversion circuit according to claim 11, wherein the mode switching circuit comprises a first transfer gate responsive to the mode signal, a second transfer gate responsive to a test mode signal and a logic circuit connected to the first and second transfer gates to open either the first or the second transfer gate in accordance with the test mode signal.

19. A charge pump circuit comprising:
a plurality of voltage conversion stages having a first stage and a second stage;
an external supply voltage terminal providing an input voltage to said charge pump;
an internal supply voltage terminal providing an output voltage;
a plurality of gate transistors having a first gate transistor, a second gate transistor, and a third gate transistor, wherein the first gate transistor is connected to said external supply voltage terminal and to said first stage, wherein said third gate transistor is connected to said internal supply voltage terminal and said second stage, and wherein the second gate transistor is connected to the first and third gate transistors; and
a bypass transistor connected to at least one of said plurality of voltage conversion stages and wherein the bypass transistor is in parallel connection to at least one of the gate transistors of said plurality of gate transistors.

20. A charge pump system comprising:
at least two charge pumps connected in parallel, wherein each charge pump comprises:
a plurality of voltage conversion stages having a first stage and a second stage;
an external supply voltage terminal providing an input voltage to said charge pump;
an internal supply voltage terminal providing an output voltage;
a plurality of gate transistors having a first gate transistor, a second gate transistor, and a third gate transistor, wherein the first gate transistor is connected to said external supply voltage terminal and to said first stage, wherein said third gate transistor is connected to said internal supply voltage terminal and said second stage, and wherein the second gate transistor is connected to the first and third gate transistors; and
a bypass transistor connected to at least one of said plurality of voltage conversion stages and wherein the bypass transistor is in parallel connection to at least one of the gate transistors of said plurality of gate transistors.

21. A method of driving a charge pump circuit comprising a plurality of voltage conversion stages having a first stage and a second stage; an external supply voltage terminal providing an input voltage to said charge pump; an internal supply voltage terminal providing an output voltage; a plurality of gate transistors having a first gate transistor, a second gate transistor, and a third gate transistor, wherein the first gate transistor is connected to said external supply voltage terminal and to said first stage, wherein said third gate transistor is connected to said internal supply voltage terminal and said second stage, and wherein the second gate transistor is connected to the first and third gate transistors; and a bypass transistor connected to at least one of said plurality of voltage conversion stages and wherein the bypass transistor is in parallel connection to at least one of the gate transistors of said plurality of gate transistors, the method comprising the steps of:
while maintaining the bypass transistor in an off state, using at least one of the plurality of voltage conversion stages and at least one of the plurality of gate transistors and converting the input voltage to a first output voltage.

22. A voltage conversion circuit including a charge pump, the circuit comprising:
   a charge pump comprising:
      a plurality of voltage conversion stages having a first stage and a second stage;
      an external supply voltage terminal providing an input voltage to said charge pump;
      an internal supply voltage terminal providing an output voltage;
      a plurality of gate transistors having a first gate transistor, a second gate transistor, and a third gate transistor, wherein the first gate transistor is connected to said external supply voltage terminal and to said first stage, wherein said third gate transistor is connected to said internal supply voltage terminal and said second stage, and wherein the second gate transistor is connected to the first and third gate transistors; and
      a bypass transistor connected to at least one of said plurality of voltage conversion stages and wherein the bypass transistor is in parallel connection to at least one of the gate transistors of said plurality of gate transistors;
   a drive circuit connected to the charge pump; and
   a mode switching circuit connected to the drive circuit for providing a mode signal to the drive circuit.

* * * * *